United States Patent [19]

Ackerman

[11] Patent Number: 4,540,867

[45] Date of Patent: Sep. 10, 1985

[54] LINEARIZED SCANNING SYSTEM AND METHOD FOR AN ENERGY BEAM

[75] Inventor: Charles B. Ackerman, Paradise Valley, Ariz.

[73] Assignee: Motorola, Inc., Schaumburg, Ill.

[21] Appl. No.: 623,890

[22] Filed: Jun. 25, 1984

[51] Int. Cl.³ .............................................. B23K 26/00
[52] U.S. Cl. ...................... 219/121 LW; 219/121 LQ; 219/121 LE; 219/121 LT; 219/121 LU; 219/121 LX
[58] Field of Search ................ 219/121 LW, 121 LQ, 219/121 L, 121 LM, 121 LE, 121 LF, 121 LK, 121 LL, 121 LT, 121 LU, 121 LX; 250/233, 234, 235, 236; 350/266, 273, 274

[56] References Cited

U.S. PATENT DOCUMENTS

| | | | |
|---|---|---|---|
| 3,256,524 | 6/1966 | Stauffer | 219/121 LK X |
| 3,725,668 | 4/1973 | Padgitt | 250/233 X |
| 4,224,096 | 9/1980 | Osborne | 219/121 LT X |
| 4,404,452 | 9/1983 | Cashwell | 219/121 LK |
| 4,404,454 | 9/1983 | Taylor et al. | 219/121 LK |
| 4,410,785 | 10/1983 | Lilly, Jr. et al. | 219/121 LK |

OTHER PUBLICATIONS

Klauser, *IBM Technical Disclosure Bulletin*, "Laser Micromachine", vol. 21, No. 11. Apr. 1979, pp. 4431-4432.

*Primary Examiner*—C. L. Albritton
*Attorney, Agent, or Firm*—William J. Kubida

[57] ABSTRACT

A scanning system for linearized application of an energy beam along at least one of a plurality of predetermined axes. Chopper means intercept the energy beam for alternately reflecting and passing the energy beam providing successive reflective and passed beams respectively therefrom. First and second scanning means receive the reflected and passed beams respectively. The first and second scanning means synchronously direct the reflected and passed beams along at least one of the predetermined axes.

17 Claims, 19 Drawing Figures

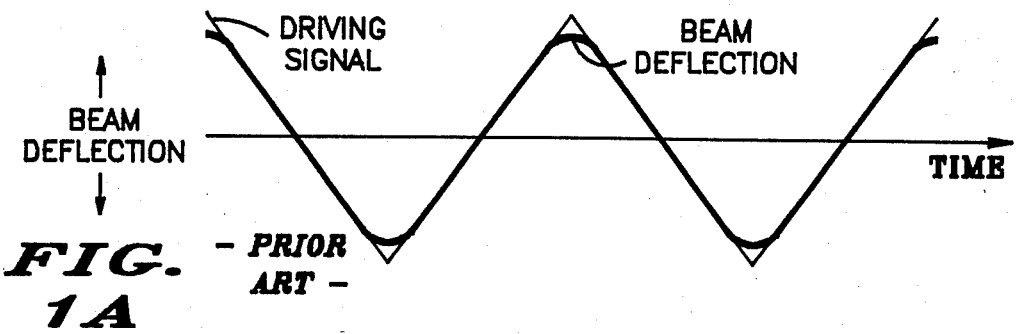
FIG. 1A — PRIOR ART —
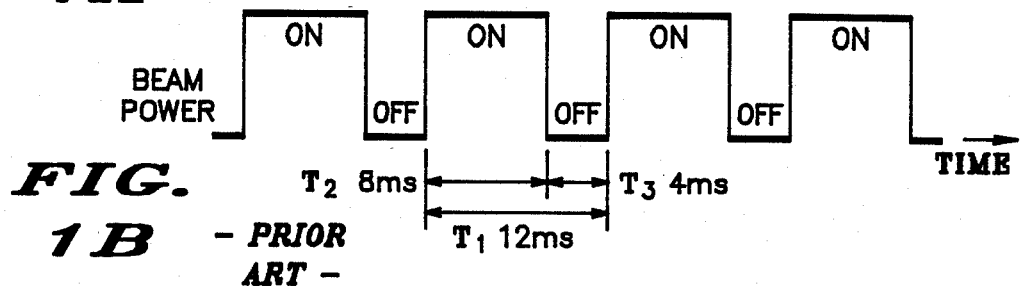
FIG. 1B — PRIOR ART —
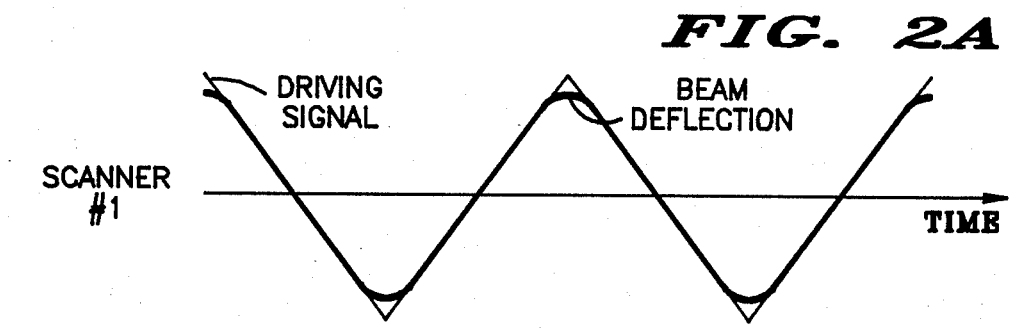
FIG. 2A
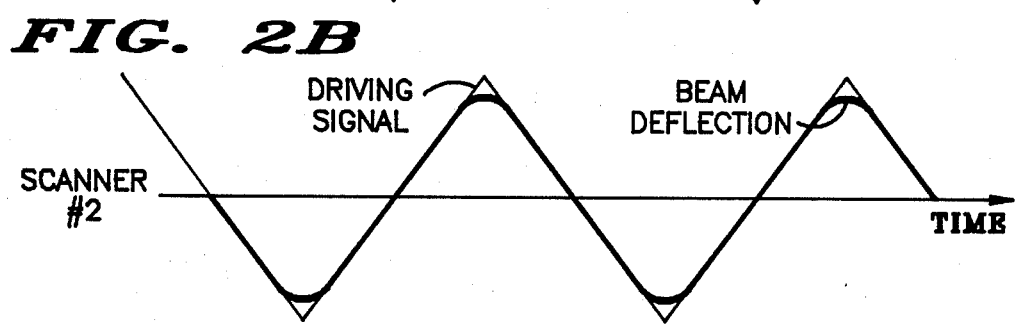
FIG. 2B
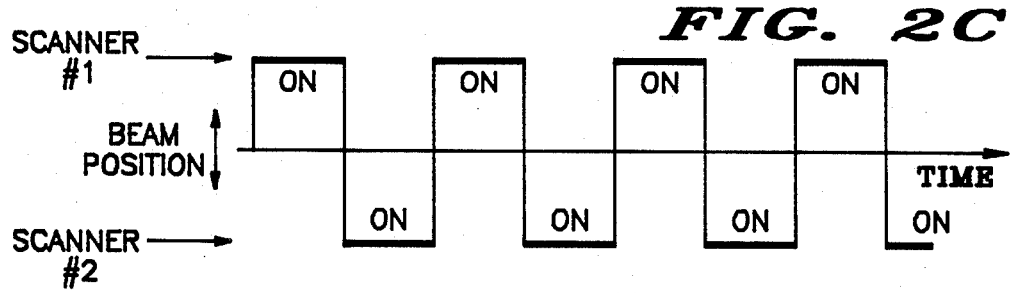
FIG. 2C

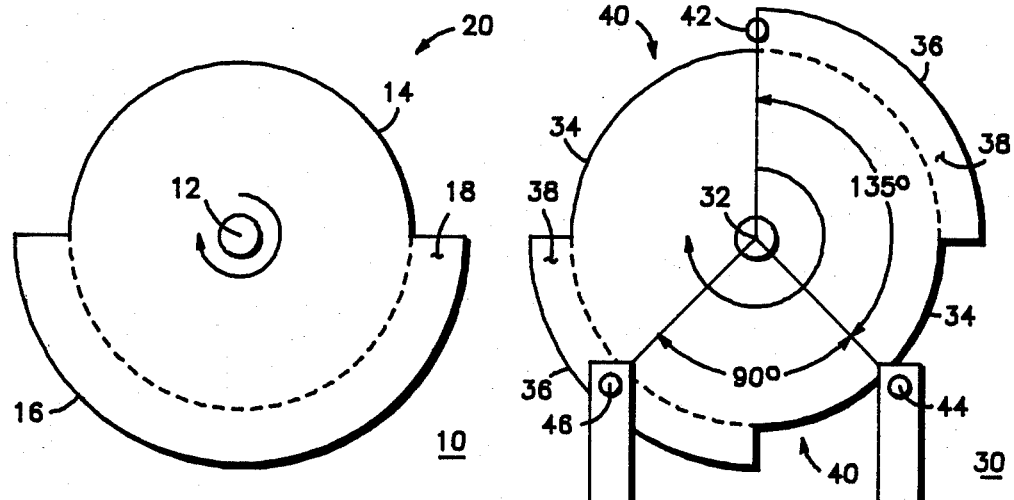
FIG. 3A  FIG. 3B
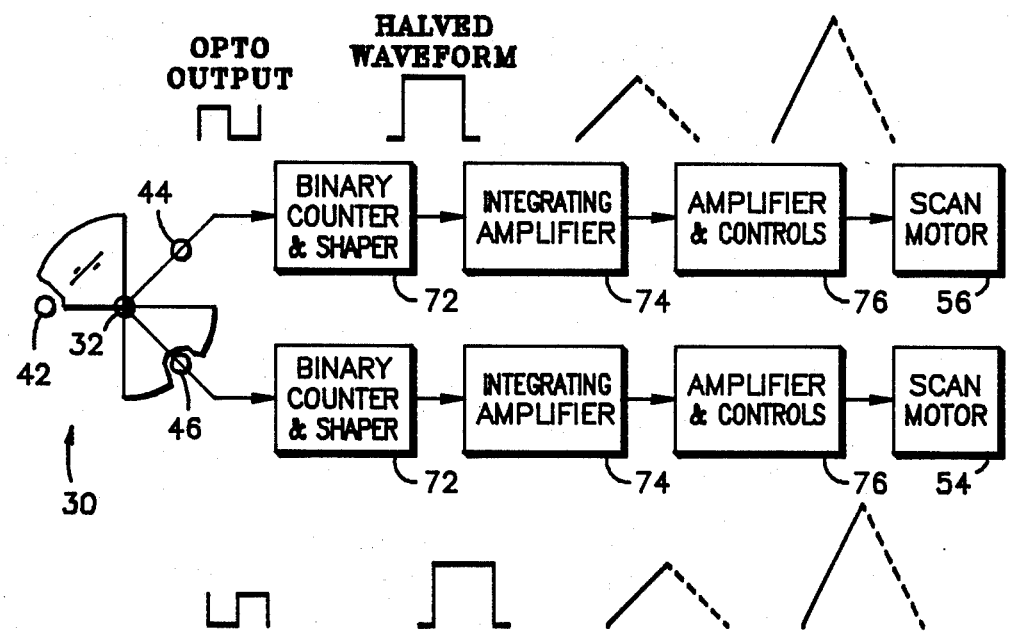
FIG. 6

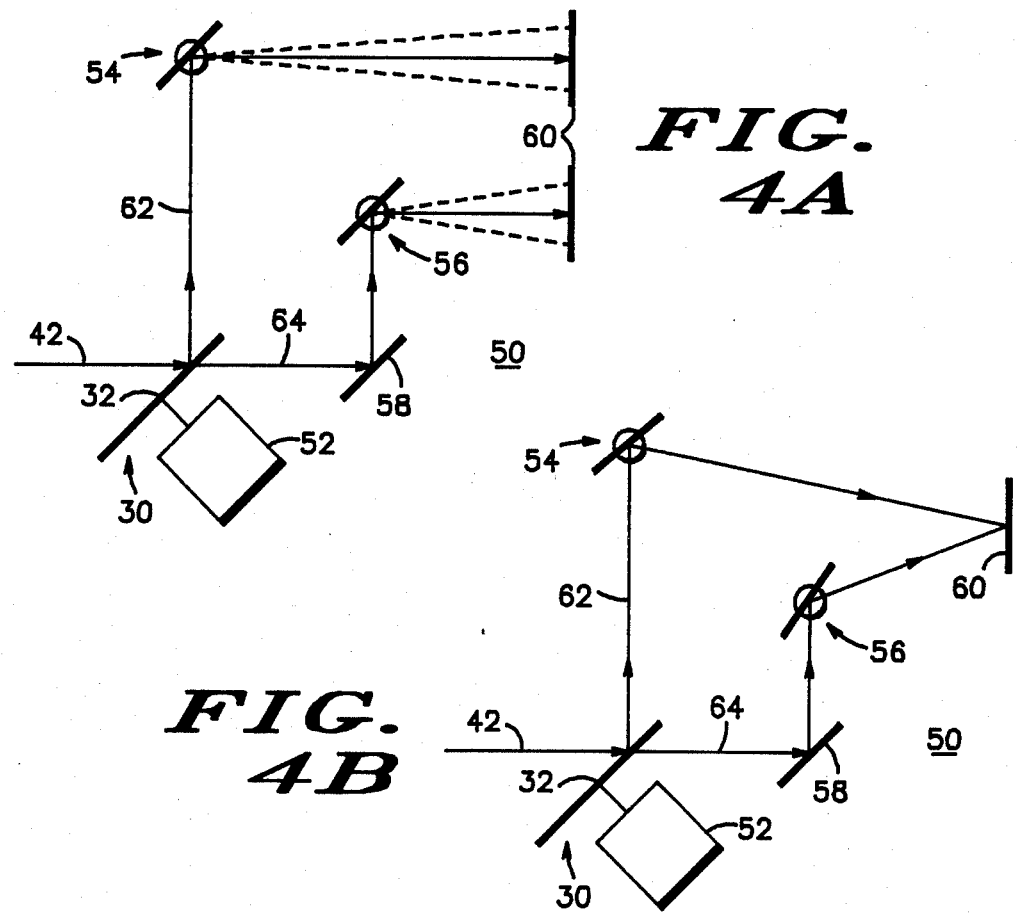
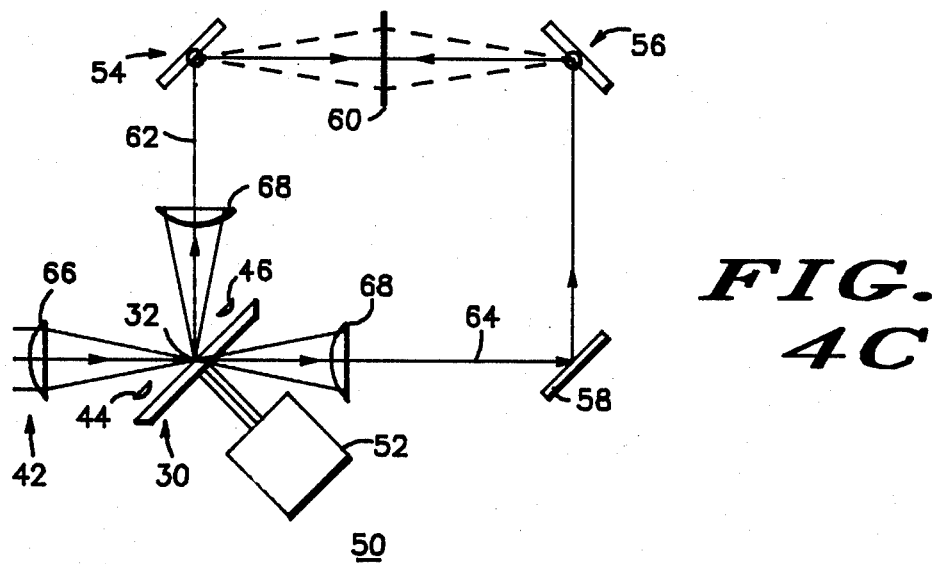

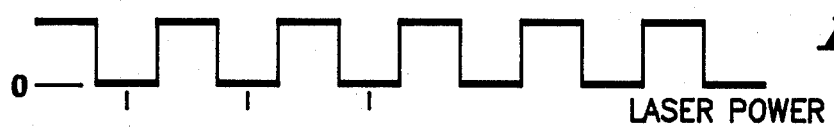
FIG. 5A LASER POWER
FIG. 5B OPTO-SENSOR
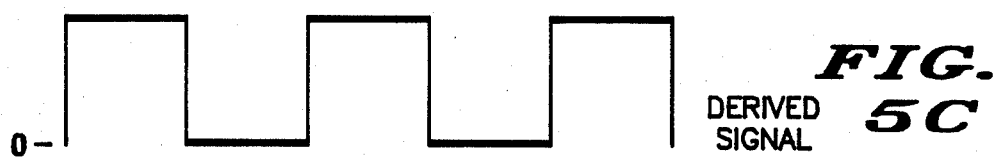
FIG. 5C DERIVED SIGNAL
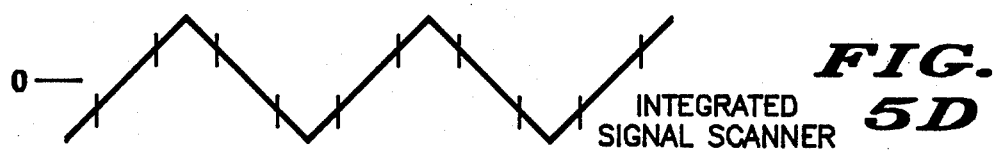
FIG. 5D INTEGRATED SIGNAL SCANNER
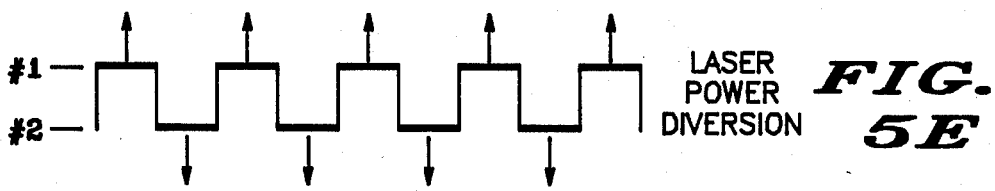
FIG. 5E LASER POWER DIVERSION
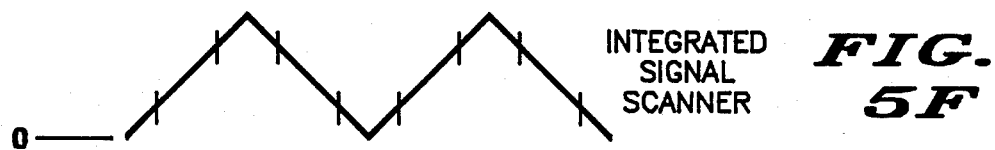
FIG. 5F INTEGRATED SIGNAL SCANNER
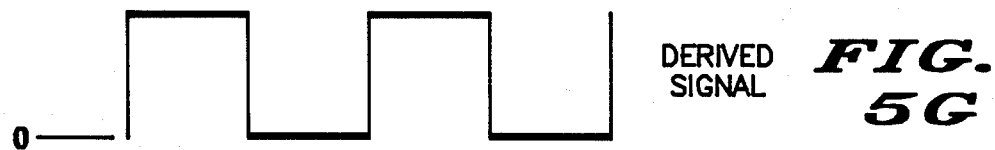
FIG. 5G DERIVED SIGNAL
FIG. 5H OPTO-SENSOR

LINEARIZED SCANNING SYSTEM AND METHOD FOR AN ENERGY BEAM

BACKGROUND OF THE INVENTION

The present invention relates, in general, to the field of linearized scanning systems and methods for an energy beam. More particularly, the present invention relates to a system and method for efficient utilization of a laser beam to provide localized zone melting for recrystallizing a thin silicon ribbon of use, for example, in the manufacture of solar cells.

In using focused laser beams to provide the localized melting needed for zone melting and recrystallizing a thin silicon ribbon, it is necessary to achieve a uniform distribution of laser power over a relatively long narrow zone. The narrow dimension of this zone is defined as the size of the focal spot of the laser beam and the longitudinal dimension by scanning the laser back and forth by means of an oscillating mirror driven by a driving signal having a triangular shaped waveform. Since the rotor of the scan galvanometer has a finite inertia, it follows that the available torque cannot make the mirror reverse direction instantaneously. By virtue of this fact, scan velocity is lower at the ends of the scan line thus producing higher temperatures at the ends of the melt zone.

One solution to the problem of providing uniform power density of a scan line would be to modulate the power of the laser itself without concern for the constant velocity of the scan. In other words, the power level of the laser could be reduced at the ends of the scan line to maintain relatively uniform temperatures along the melt zone. However, an inherent limitation in this approach is the fact that certain lasers are not readily modulated and therefore such a technique restricts the type of laser which might be employed. Moreover, such a modulation system is not readily effectuated and would require additional and unduly complex equipment.

Another approach to achieving essentially uniform power density along a scan line would be to chop the non-linear portion of each scan of the laser beam in synchronism with the scan galvanometer so as to eliminate these non-linear portions. This may be effectuated by mechanically interrupting the beam with a rotating disc. Utilizing this approach, the interrupted energy of the laser beam is simply lost.

In either of the above approaches, valuable laser capability is lost and a significant investment in laser capacity is not being efficiently utilized. In performing zone melting and recrystallizing of thin silicon ribbons, the capital cost of the laser used is a significant economic factor. For example, a typical high power laser costs on the order of approximately $100 per watt. Therefore, if a one kilowatt laser is being disabled $33\frac{1}{3}\%$ of the time, a sizable amount of energy, and hence capital investment is being wasted.

SUMMARY OF THE INVENTION

It is therefore an object of the present invention to provide an improved linearized scanning system and method for an energy beam.

It is further an object of the present invention to provide an improved linearized scanning system and method for an energy beam which is readily and inexpensively fabricated.

It is still further an object of the present invention to provide an improved linearized scanning system and method for an energy beam which does not require modulation of a laser power output and can be utilized with any type of laser.

It is still further an object of the present invention to provide an improved linearized scanning system and method for an energy beam which permits virtually 100% utilization of available laser power.

The foregoing and other objects are achieved in the present invention wherein there is provided a scanning system and method for linearized application of a continuous energy beam along at least one of a plurality of predetermined axes. The scanning system comprises chopper means intercepting the energy beam for alternately reflecting and passing the energy beam and providing successive reflected and passed beams respectively therefrom. First and second scanning means are provided for receiving the reflected and passed beams respectively, the first and second scanning means synchronously directing the reflected and passed beams along at least one of the predetermined axes.

BRIEF DESCRIPTION OF THE DRAWINGS

The above-mentioned and other features and objects of the invention and the manner of attaining them will become more apparent and the invention itself will be best understood by reference to the following description of an embodiment of the invention taken in conjunction with the accompanying drawings, wherein:

FIGS. 1A and 1B illustrate a triangular waveform utilized in driving a laser scanning system superimposed on the useful linear portion of the laser beam and further showing the effective utilization of the laser beam power in a prior art system;

FIGS. 2A, 2B, and 2C illustrate a triangular waveform utilized in driving a dual laser scanning system superimposed on the useful linear portions of the laser beams and further showing the effective utilization of a linearized scanning system in accordance with the present invention;

FIGS. 3A and 3B illustrate alternative embodiments of a reflectorized chopper disc for utilization in effectuating the nearly 100% beam efficiency illustrated in FIG. 2C, FIG. 3B further illustrating the positioning of opto sensors for providing synchronous operation of scan galvanometers in a linearized scanning system in accordance with the present invention;

FIGS. 4A, 4B, and 4C illustrate alternative embodiments of a linearized scanning system in accordance with the present invention utilizing, for example, the reflectorized chopper discs of FIGS. 3A and 3B; FIG. 4C further illustrating the utilization of focusing and converging lenses therewith;

FIGS. 5A–5H illustrate typical waveforms in a scan driving circuit utilizing the opto sensors of FIG. 3B in a linearized scanning system in accordance with the present invention; and FIG. 6 illustrates a scan driving circuit utilizing an idealized reflectorized chopper disc as shown in FIG. 3B and the derivation of the scan galvanometer driving signal as shown in FIGS. 5A–5H.

DESCRIPTION OF A PREFERRED EMBODIMENT

With reference to FIGS. 1A and 1B, a triangular waveform utilized in driving a laser scanning system is shown. The curve marked "driving signal" illustrates an input to a scan galvanometer or mechanical driven mirror which oscillates a few degrees and scans a predetermined axis or line pattern for reflecting a laser beam to zone melt and recrystallize a silicon ribbon. Ideally, the scan of the mirror would be perfectly linear and provide an instantaneous change of direction of its extremes, thereby perfectly tracking the triangular wave shape of the driving signal. However, such a linear scan is, of course, impossible since the scan galvanometer rotor has a finite inertia and the available torque cannot make the mirror reverse direction instantaneously. This is illustrated by the curve marked "beam deflection" superimposed on the triangular driving signal.

By chopping the laser beam in synchronism with the scanner, the non-linear portions of the scan may be eliminated. In prior art systems, this was done by either modulating the laser power supply or mechanically interrupting the beam with a rotating disc. In this manner, the utilization of beam power is as shown in FIG. 1B wherein during a time period $T_1$ a linear scan is obtained for a time period $T_2$ while laser capability is lost for a time period $T_3$. In the embodiment illustrated, wherein $T_1 = 12$ milliseconds, the laser may be effectively utilized during the linear scan for a portion of but 8 milliseconds resulting in a wastage of 4 milliseconds of laser capability. Thus, the efficiency of such a system is only 66.6%.

Referring additionally to FIGS. 2A, 2B, and 2C, the triangular waveforms for driving a pair of respective scan galvanometers is shown. As can be seen, by utilization of two scan galvanometers in synchronism, linear portions of the corresponding beam deflection curves occur alternately at each of the scan galvanometers. Thus, if laser power can be utilized at two locations, whether separate or along the same predetermined axis or localized melting location, a laser utilization approaching 100% of laser capacity may be obtained as shown in FIG. 2C. In this latter illustration, a linear portion of the laser scan appears successively on alternate ones of the scan galvanometers.

Referring additionally now to FIG. 3A, a reflectorized chopper disc 10 is shown useful in effectuating the 100% effective usage of laser power hereinbefore described. The reflectorized chopper disc 10 comprises a generally circular disc shaped wheel which may be rotated about axis 12. Reflectorized chopper disc 10 presents a lesser circumference 14 subtending 180° from a vertex defined by axis 12. In like manner, reflectorized chopper disc 10 also presents an outer circumference 16 subtending the remaining 180° about axis 12. A reflective face 18 is affixed to reflectorized chopper disc 10 adjacent outer circumference 16. The space surrounding lesser circumference 14 is defined as an aperture 20 for allowing an incident energy beam to pass which would otherwise be reflected by reflective face 18 upon incidence thereto.

Referring additionally now to FIG. 3B, an alternative embodiment of reflectorized chopper disc 30 is shown. Reflectorized chopper disc 30 may be preferred to the embodiment of FIG. 3A due to its inherent balance to rotational movement about axis 32. Moreover, by use of reflectorized chopper disc 30, a synchronized drive signal for a pair of scan galvanometers may be derived by means of opto sensors 44, 46 as will be more fully described hereinafter.

Reflectorized chopper disc 30 presents a lesser circumference 34 at diametrically opposed portions of its periphery each subtending 90° from a vertex defined at axis 32. Similarly, an outer circumference 36 is presented at diametrically opposed locations each subtending an additional 90° from the vertex. Reflectorized chopper disc 30 presents a pair of reflective faces 38 adjacent outer circumference 36. The space between reflective faces 38 surrounding lesser circumference 34 is defined as apertures 40.

By use of reflectorized chopper disc 30, a laser beam 42 may be directed incident thereto at a 12 o'clock position. In this manner, laser beam 42 will be alternately reflected or allowed to pass by incidence to reflective faces 38 or one of apertures 40. In addition, a pair of opto sensors 44, 46 are positioned at the 4 o'clock and 8 o'clock positions about axis 32 for developing a scan drive signal. Opto sensors 44, 46 comprise an individual light source and sensor, the light source being directed toward reflective faces 38 and apertures 40 for providing either an on or off indication in response thereto. The phase relationship between the reflection or passing of laser beam 42 with respect to the output of opto sensors 44, 46 will be more fully described hereinafter.

With reference to FIG. 4A, a linearized scanning system 50 in accordance with the present invention is shown. Linearized scanning system 50 comprises a motor 52 rotatably driving reflectorized chopper disc 30 about its axis 32. A laser beam 42 is directed to reflectorized chopper disc 30 which alternately provides a reflected beam 62 and passed beam 64. Reflected beam 62 is directed to a scan galvanometer 54 driving an oscillating mirror for redirection to a silicon ribbon 60 along a predetermined axis thereof. In like manner, passed beam 64 is directed to a fixed mirror 58 for reflection to scan galvanometer 56 driving an oscillating mirror for redirection to silicon ribbon 60 along a separate predetermined axis from that of reflected beam 62. It should be noted that in some applications fixed mirror 58 may either be unnecessary or utilized to redirect reflected beam 62. By synchronizing linear scanning system 50 such that reflectorized chopper disc 30 and scan galvanometers 54, 56 operate only during the linear portion of the scan, maximum efficiency may be derived from input laser beam 42.

Referring additionally now to FIG. 4B, an alternative embodiment of linearized scanning system 50, is shown. In this embodiment, similar structure to that previously described with respect to FIG. 4A is similarly numbered and the foregoing description thereof is likewise the same. By utilization of the embodiment of FIG. 4B, reflected beam 62 and passed beam 64 are respectively redirected by means of scan galvanometers 54, 56 to a single predetermined axis for providing a localized melt needed for zone melting and recrystallization of silicon ribbon 60.

Referring additionally now to FIG. 4C, an additional alternative embodiment of linearized scanning system 50 is shown. As with the aforedescribed embodiments of FIGS. 4A and 4B, similar structure to that already described with respect to those embodiments is similarly numbered and the foregoing description thereof is sufficient herefor. In this embodiment of linearized scanning system 50, reflected beam 62 and passed beam 64 are directed respectively to scan galvanometers 54, 56 such that the available power of laser beam 42 is applied to opposite sides of silicon ribbon 60. Additionally, focusing lens 66 is utilized to intercept laser beam 42 such that it is focused toward reflectorized chopper disc 30. Focusing lens 66 may be necessary to obtain the proper rise and fall time for approximating a square wave chopping of laser beam 42 into reflected beam 62 and passed beam 64. With certain lasers, the diameter of laser beam 42 may be such that its extinction between passed beam 64 and reflected beam 62 may be too slow, and it may not be practical to rotate reflectorized chopper disc 30 about axis 32 at too great a speed without causing concomitant operational problems in linearized scanning system 50.

A typical scanning rate for use with scan galvanometers 54, 56 is approximately 40 Hz. This frequency is near the lower limit for minimizing heat fluctuations due to cooling between beam passages on silicon ribbon 60, but is low enough to produce a linear scan over more than 50% of the scan amplitude. Linearized scanning system 50 permits increasing this rate significantly with possible advantage to the recrystallization of fine grain polysilicon. When utilizing a 40 Hz frequency for scan galvanometers 54 and 56, reflectorized chopper disc 30 must run at a scanner frequency of 2,400 rpm. Utilizing a laser beam 42 diameter of 0.75 inches and a reflectorized chopper disc 30 diameter of 6 inches, a rise and fall time of about 1 millisecond is achieved. This rise and fall time may be greatly decreased by focusing laser beam 42 by means of focusing lens 66 and later recollimating reflected beam 62 and passed beam 64 by means of converging lenses 68. In this latter instance, rise and fall times of 1/20th of a millisecond may be readily achieved.

The oscillating mirrors driven by scan galvanometers 54, 56 must run 90° out of phase with each other and be synchronized with reflectorized chopper disc 30. This requirement is met by optically picking up two synchronizing signals from reflectorized chopper disc 30 by means of opto sensors 44, 46 and using them to derive this scanner drive wave forms. As above described, opto sensors 44, 46 comprise an integral light source and sensor.

Referring additionally now to FIGS. 5A–5H and 6, a scan driving circuit 70 useful in generating the properly synchronized scan drive may be achieved by deriving the scanner drive signal directly from stationary opto sensors 44, 46 and providing square waves of the same period as the chopper laser beam 42. Opto sensors 44, 46 are positioned to maintain the correct phase relationship regardless of the speed of reflectorized chopper disc 30.

By positioning opto sensors 44 and 46 45° from the position of laser beam 42, i.e. at 135° and 225° for example, two sets of square waves as shown in FIGS. 5B and 5H are generated having the requisite 90° phase relationship to each other. The leading edge of every other pulse corresponds to the peak of the desired triangular wave driving signals of FIGS. 5D and 5F. Thus, by simply processing the output of opto sensors 44, 46 by means of respective binary count and shape circuits 72 which provide a single binary division, a square wave with half the frequency is generated as shown in FIGS. 5C and 5G. These signals are in turn integrated by means of respective integrating amplifiers 74 to produce the triangular shape needed to drive scan motors 54, 56. These triangular signals are in turn amplified through amplifier and control circuits 76 to provide the drive signal for the scans. In design of scan driving circuitry 70, circuit delays should be made negligibly small and identical for each channel. Once set up to run at a selected speed, scan driving circuit 70 will be stable for moderate changes in the angular velocity of reflectorized chopper disc 30.

What has been provided therefore is an improved linearized scanning system and method for an energy beam which is readily and inexpensively fabricated. The linearized scanning system and method of the present invention does not require modulation of the laser power output and may be utilized with any type of laser. The scanning system and method of the present invention also permits virtually 100% utilization of available laser power.

While there have been described above the principles of this invention in conjunction with specific apparatus, it is to be clearly understood that this description is made only by way of example and not as a limitation to the scope of the invention.

I claim:

1. A scanning system for linearized application of an energy beam along at least one of a plurality of predetermined axes comprising:
    chopper means intercepting said energy beam for alternately reflecting and passing said energy beam and providing successive reflected and passed beams respectively therefrom; and
    first and second scanning means for receiving said reflected and passed beams respectively, said first and second scanning means synchronously directing said reflected and passed beams along at least one of said predetermined axes.

2. The scanning system of claim 1 wherein said energy beam is a laser beam.

3. The scanning system of claim 1 wherein said chopper means comprises a motor driven, reflectorized chopper disc having at least one reflective face and aperture thereof.

4. The scanning system of claim 1 wherein said first and second scanning means comprise scan galvanometers.

5. The scanning system of claim 4 wherein said scan galvanometers are oscillatory in motion.

6. The scanning system of claim 1 wherein said predetermined axes are co-extensive.

7. The scanning system of claim 1 wherein said predetermined axes are not co-extensive.

8. The scanning system of claim 1 further comprising a fixed reflective surface interposed between said chopper means and said second scanning means for intercepting said passed beam and reflecting said passed beam to said second scanning means.

9. The scanning system of claim 1 further comprising a plurality of opto sensors in conjunction with said chopper means for providing synchronized input signals to a scan driving circuit operably controlling said first and second scanning means.

10. A method for linearized scanning of a continuous energy beam along at least one of a plurality of predetermined axes comprising the steps of:
    providing a source of said energy beam;
    interrupting said energy beam by means of a chopper;
    reflecting said energy beam by means of said chopper producing a reflected beam;
    alternately passing said energy beam by means of said chopper providing a passed beam;
    receiving said reflected and passed beams by means of respective first and second scanning means; and synchronously directing said reflected and passed beams along at least one of said predetermined axes.

11. The method of claim 10 wherein said step of providing is carried out by means of a laser.

12. The method of claim 10 wherein said step of interrupting is carried out by means of a motor driven reflectorized chopper disc having at least one reflective face and aperture thereof.

13. The method of claim 12 wherein said step of reflecting is carried out by said reflective face.

14. The method of claim 12 wherein said step of alternately passing is carried out by means of said aperture.

15. The method of claim 10 wherein said step of receiving is carried out by means of first and second scan galvanometers.

16. The method of claim 10 wherein said step of receiving said passed beam is carried out by means of a fixed reflective surface for reflecting said passed beam to said second scanning means.

17. The method of claim 10 wherein said step of synchronously directing is carried out by means of a plurality of opto sensors for providing synchronized input signals for operably controlling said first and second scanning means.

* * * * *